(12) United States Patent
Ohkubo et al.

(10) Patent No.: US 6,212,677 B1
(45) Date of Patent: Apr. 3, 2001

(54) GENERATING A NATURAL LANGUAGE SPECIFICATION OF A COMPUTER PROGRAM BY GENERATING AN INTERMEDIATE EXPRESSION TABLE BASED ON A FLOW CHART FROM ANALYZED SYNTAX OF THE PROGRAM

(75) Inventors: Takao Ohkubo; Toshiaki Yoshino, both of Kawaski (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/709,116

(22) Filed: Sep. 6, 1996

Related U.S. Application Data

(63) Continuation of application No. 08/381,436, filed on Jan. 31, 1995, now abandoned.

(30) Foreign Application Priority Data

Feb. 2, 1994  (JP) .................................................. 6-011107

(51) Int. Cl.[7] .................................................... G06F 9/06
(52) U.S. Cl. ........................................ 717/7; 717/5; 717/8
(58) Field of Search ........................................ 717/5, 8, 7

(56) References Cited

U.S. PATENT DOCUMENTS

| | | | | |
|---|---|---|---|---|
| 4,710,863 | * | 12/1987 | Kaufmann et al. ................... | 365/146 |
| 4,831,525 | * | 5/1989 | Saito et al. ........................... | 395/700 |
| 4,831,580 | * | 5/1989 | Yamada ................................ | 395/133 |
| 4,860,203 | * | 8/1989 | Corrigan et al. ..................... | 395/700 |
| 4,872,167 | * | 10/1989 | Maezawa et al. ............... | 395/183.14 |
| 4,956,773 | * | 9/1990 | Saito et al. ............................ | 395/159 |
| 5,034,899 | * | 7/1991 | Schult ................................... | 365/518 |
| 5,038,316 | * | 8/1991 | Hempleman et al. ............... | 395/146 |
| 5,038,348 | * | 8/1991 | Yoda et al. ..................... | 395/183.14 |
| 5,129,046 | * | 7/1992 | Tanabe et al. ....................... | 395/100 |
| 5,185,867 | * | 2/1993 | Ito ....................................... | 395/375 |
| 5,258,919 | * | 11/1993 | Yamanouchi et al. ............... | 364/489 |
| 5,414,847 | * | 5/1995 | Tsukakoshi .......................... | 395/650 |
| 5,432,942 | * | 7/1995 | Trainer ................................. | 395/700 |
| 5,446,911 | * | 8/1995 | Juso et al. ............................ | 395/800 |
| 5,452,206 | * | 9/1995 | Turrietta et al. ................ | 364/419.17 |
| 5,530,863 | * | 6/1996 | Hino ..................................... | 395/707 |
| 5,742,827 | * | 4/1998 | Ohkubo et al. ...................... | 395/701 |

OTHER PUBLICATIONS

AREFI, Hughes & Workman, Automatically Generating Visual Syntax–Directed Editors, Communications of the ACM, vol. 33, No. 3, Mar. 1990, pp. 349–360.*

* cited by examiner

Primary Examiner—Thomas C. Lee
Assistant Examiner—Ilwoo Park
(74) Attorney, Agent, or Firm—Staas & Halsey LLP

(57) ABSTRACT

A specification generating method for a computer program comprises the steps of: analyzing the syntax of a predetermined computer program; generating a control flowchart based on the analyzed syntax; generating an intermediate expression table based on the control flowchart; providing block numbers for calls and branched destinations; attaching an item number and a heading to every call and branched destination; and generating the specification of the computer program, using a natural language based on the item number and the heading.

12 Claims, 39 Drawing Sheets

Fig.1A
{ PROGRAM  
( A PART OF PROCEDURE ) }
MOVE 10 TO A.
IF C > 10 THEN
MOVE A TO B
ELSE
MOVE 20 TO B.
Fig.1B
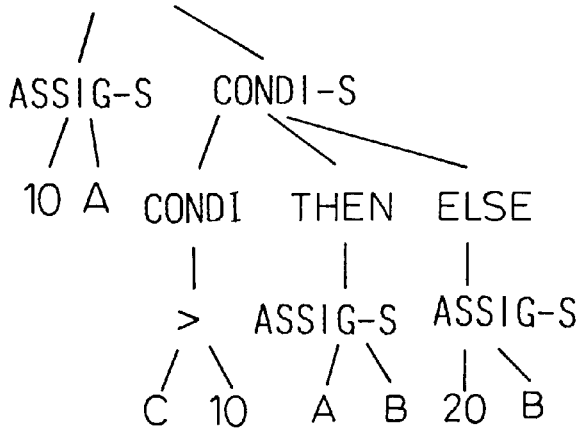
[SYNTAX TREE]
Fig.1C
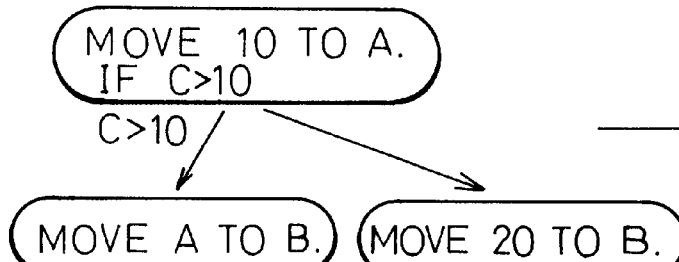
{ CONTROL FLOWCHART }
Fig.1D
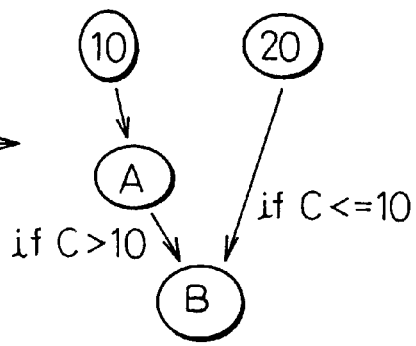
[DATA FLOWCHART]

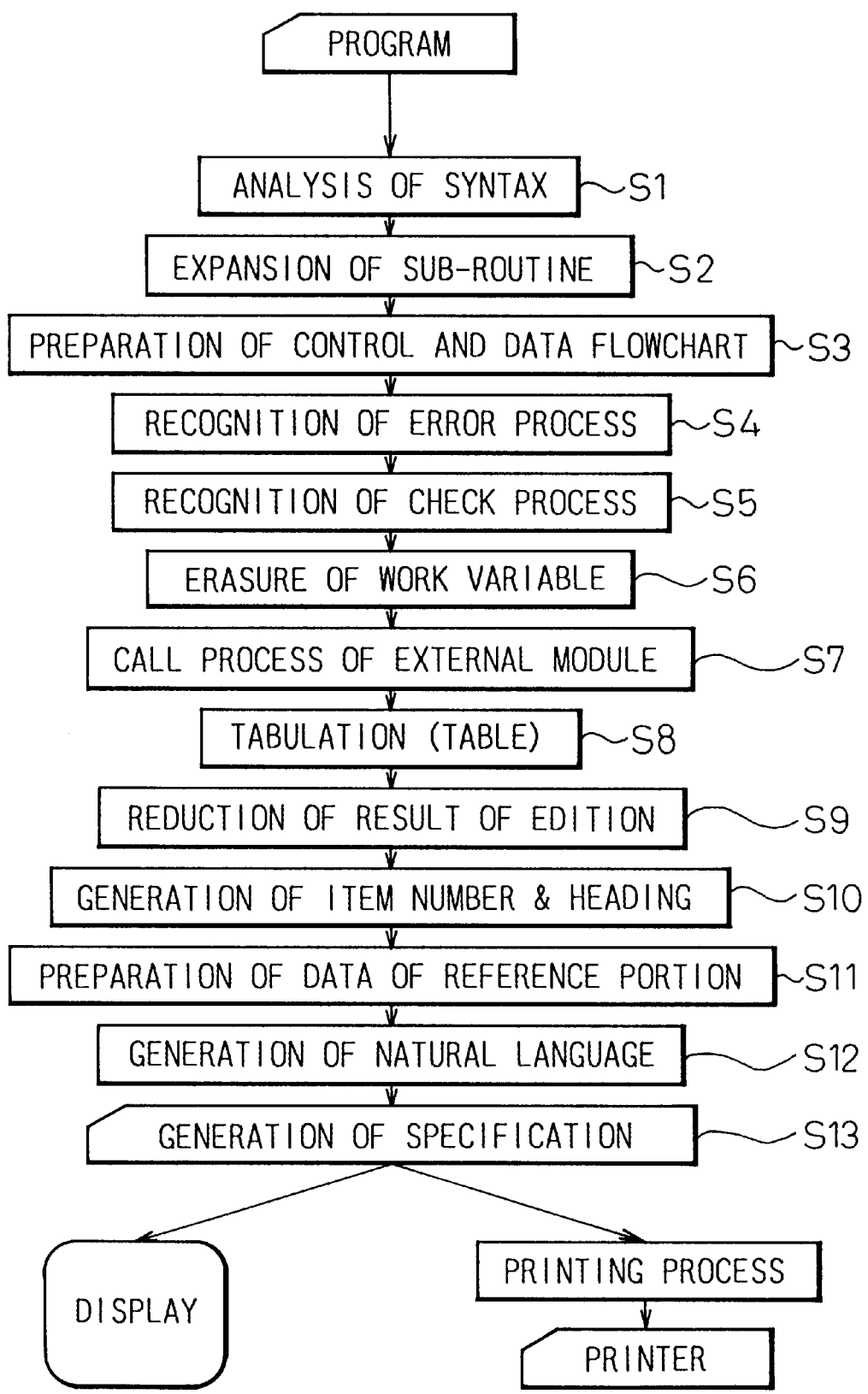

MOVE A TO B.
PERFORM SEC-ERROR.
MOVE C TO D.

...

SEC-ERROR SECTION.
MOVE E TO F.

```
:
(*assign* 12 120 ("3. 1" "SETTING OF PARAMETER") (*from* A) (*to* B))
(*perform* 13 121 ("3. 2" "CALL OF ERROR PROCESS") SEC-ERROR)
(*assign* 14 122 ("3. 3" "SETTING OF RETURN CODE") (*from* E) (*to* F))
:
(*section* 30 250 ("6. " "ERROR PROCESS") SEC-ERROR
  (*assign* 30 251 ("6. 1" "SETTING OF MESSAGE CODE") (*from* C) (*to* D))
)
```

Fig.6

3. 1 SETTING OF PARAMETER

SET A TO PARAMETER B 3. 2 CALL OF ERROR PROCESS

6. EXECUTE ERROR PROCESS 3. 3 SETTING OF RETURN CODE

SET E TO RETURN CODE F

...

6. ERROR PROCESS 6. 1 SETTING OF MESSAGE CODE

SET C TO MESSAGE CODE D

Fig.7

```
GENERATION OF CONTROL FLOWCHART    ~S21
           ↓
GENERATION OF INTERMEDIATE         ~S22
EXPRESSION
           ↓
CALL & TAKE BLOCK NUMBER           ~S23
OF DESTINATION
           ↓
CALL & TAKE ITEM NUMBER AND        ~S24
HEADING OF DESTINATION
           ↓
         ( END )
```

CALL 'SUB-MODULE'.

EVALUATE A
   WHEN 1
      IF B=2 THEN PERFORM SHORI1
             ELSE CONTINUE
      END-IF
   WHEN 2
      IF B=1 THEN GOTO ERR.
             ELSE PERFORM SHORI2
      END-IF
END-EVALUATE.

MOVE 1 TO C.
....
```

Fig.9

3. CALL OF SUB-MODULE 3.1 CALL "SUB-MODULE"

3.2 CONFIRMATION OF RESULT OF REQUEST 3.2.1 WHEN A=1

3.2.1.1 IF B=2, 5. EXECUTE CHECK PROCESS 3.2.1.2 ELSE, CONTINUE FOLLOWING PROCESS 3.2.2 WHEN A=2

3.2.2.1 IF B=1, 7. EXECUTE ERROR PROCESS 3.2.2.2 ELSE, 6. EXECUTE EDITING PROCESS

4. SETTING OF RETURN CODE

SET 1 TO C

Fig.11

```
(*call* 5 60 ("3.1" "") 'SUB-MODULE')

(*evaluate* 6 61 ("3.2" "CONFIRM RESULT OF REQUEST") (*explist* A)
 (*when* 1
   (*if* 7 63 ("3.2.1" "") (B=2)
     (*then* (*perform* 8 64 ("3.2.1.1" "") SHORI1)
     (*else* (*continue* 9 65 ("3.2.1.2" "") "")))))
 (*when* 2
   (*if* 10 67 ("3.2.2" "") (B=1)
     (*then* (*perform* 11 68 ("3.2.2.1" "") ERR)
     (*else* (*perform* 12 69 ("3.2.2.2" "") SHORI2)))))
)

(*assign* 13 70 ("4." "SETTING OF RETURN CODE") (*from* 1) (*to* C))
```

Fig.12

3. CALL OF SUB-MODULE (1) CALL "SUB-MODULE"

(2) CONFIRMATION OF RESULT OF REQUEST a. WHEN A=1

(a) IF B=2, 5. EXECUTE CHECK PROCESS (b) ELSE, 4. SETTING OF RETURN CODE b. WHEN A=2

(a) IF B=1, 7. EXECUTE ERROR PROCESS (b) ELSE, 6. EXECUTE EDITING PROCESS

4. SETTING OF RETURN CODE

SET 1 TO C

Fig.16

```
ERR1.
IF A=1 THEN PERFORM SHORI1
ELSE IF B=2 THEN PERFORM SHORI2
ELSE PERFORM SHORI3
END-IF.

PERFORM SHORI4.

SHORI1 SECTION.
...
MOVE 1 TO A.

SHORI2 SECTION.
...
EXIT-PROGRAM.

SHORI3 SECTION.
...
GOTO SEC-ERROR.ERR1.
```

Fig.17

6.2 ERROR PROCESS FOR RESULT OF REQUEST

EXECUTE FOLLOWING PROCESS

| CONDITION | | CONTENTS OF PROCESS |
|---|---|---|
| A = 1 | | 7. CHECK PROCESS |
| A ≠ 1 | B = 2 | 8. EDITING PROCESS, RETURN TO REQUEST SOURCE |
| | ELSE | 9. CALL PROCESS, 6.2 ERROR PROCESS FOR RESULT OF REQUEST |

6.3 SHAPED-OUTPUT

SUBSTITUTE 50000 FOR X

WHEN SUBSTITUTING X FOR Y, PROVIDE "," FOR EVERY THREE CARRIES FROM RIGHT SIDE.
EXCEPT FOR FIRST CARRY, OUTPUT "BLANK" FOR CARRY HAVING NO DATA

7. CHECK PROCESS
...
8. EDITING PROCESS
...
  RETURN TO REQUEST SOURCE
9. CALL PROCESS
...
  6.2 ERROR PROCESS FOR RESULT OF REQUEST

Fig.20

```
PERFORM SEC-ERROR.
MOVE C TO D.
...
SEC-ERROR SECTION.
MOVE E TO F.
ERR1.
IF A=1 THEN PERFORM SHORI1
ELSE IF B=2 THEN PERFORM SHORI2
ELSE PERFORM SHORI3
END-IF

PERFORM SHORI4.
...
SHORI4 SECTION.
MOVE 50000 TO X.
MOVE X TO Y.
```

Fig.21

2. CALL OF ERROR PROCESS

6. EXECUTE ERROR PROCESS

3. SETTING OF RETURN CODE

SET E TO RETURN CODE F

...

6. ERROR PROCESS 6.1 SETTING OF MESSAGE CODE

SET E TO MESSAGE CODE F 6.2 ERROR PROCESS FOR RESULT OF REQUEST

EXECUTE FOLLOWING PROCESS

| CONDITION | | CONTENTS OF PROCESS |
|---|---|---|
| A=1 | | 7. EXECUTE CHECK PROCESS |
| A=1 | B=2 | 8. EDITING PROCESS, RETURN TO REQUEST SOURCE |
| | ELSE | 9. CALL PROCESS 6.2 ERROR PROCESS FOR RESULT OF REQUEST |

6.3 SHAPED-OUTPUT
    SUBSTITUTE 50000 FOR X

WHEN SUBSTITUTING X FOR Y, PROVIDE "," FOR EVERY THREE CARRIES FROM RIGHT OF DATA.
EXCEPT FOR FIRST CARRY, OUTPUT "BLANK" FOR CARRY HAVING NO DATA.

Fig.22

```
...
DATA DIVISION.

01  X PIC 9(9).
01  Y PIC ZZZ,ZZZ,ZZ9.

...
PROCEDURE DIVISION.

...
MOVE 50000 TO X.
...
MOVE X TO Y.
```

Fig.23

(EXPLANATION BASED ON PICTURE CLAUSE)

SET X TO Y BY ZZZ, ZZZ, ZZ9

Fig.24

(DETAILED EXPLANATION)

WHEN SUBSTITUTING X FOR Y, PROVIDE "," FOR EVERY THREE CARRIES FROM RIGHT OF DATA. EXCEPT FOR FIRST CARRY, OUTPUT "BLANK" FOR CARRY HAVING NO DATA

Fig. 26

```
IDENTIFICATION            DIVISION.
PROGRAM-ID.               EXAM1.

ENVIRONMENT               DIVISION.
CONFIGURATION             SECTION.
  SOURCE-COMPUTER. FACOM.
  OBJECT-COMPUTER. FACOM.

DATA                      DIVISION.
WORKING-STORAGE SECTION.
  01 A PIC 9(1).
  01 B PIC 9(1).
  01 C PIC 9(1).

PROCEDURE                 DIVISION.
  SEC-MAIN SECTION.
    IF A=1 THEN PERFORM SHORI1
    ELSE IF B=2 THEN PERFORM SHORI2
    ELSE PERFORM SHORI3
    END-IF.

SEC-MAIN-E.
    GOBACK.
```

Fig.27

```
  IDENTIFICATION            DIVISION.
  PROGRAM-ID.               EXAM3.
/
  ENVIRONMENT               DIVISION.
  CONFIGURATION             SECTION.
    SOURCE-COMPUTER. FACOM.
    OBJECT-COMPUTER. FACOM.
/
  DATA                      DIVISION.
  WORKING-STORAGE SECTION.
    01 A PIC 9(1).
    01 B PIC 9(1).
    01 C PIC 9(1).

PROCEDURE                 DIVISION.
   SEC-MAIN SECTION.

EVALUATE A B C
        WHEN 1 2 3 PERFORM SHORI1
        WHEN 4 5 6 PERFORM SHORI2
        WHEN 7 8 9 PERFORM SHORI3
     END-EVALUATE.

SEC-MAIN-E.
     GOBACK.
```

Fig.28

```
IDENTIFICATION            DIVISION.
PROGRAM-ID.               EXAM2.
/
ENVIRONMENT               DIVISION.
CONFIGURATION             SECTION.
  SOURCE-COMPUTER. FACOM.
  OBJECT-COMPUTER. FACOM.
/
DATA                      DIVISION.
WORKING-STORAGE SECTION.
  01 A PIC 9(1).
  01 B PIC 9(1).
  01 C PIC 9(1).

PROCEDURE                 DIVISION.
  SEC-MAIN SECTION.
    EVALUATE A
      WHEN 1 PERFORM SHORI1
      WHEN 2 PERFORM SHORI2
      WHEN 3 PERFORM SHORI3
    END-EVALUATE.

SEC-MAIN-E.
    GOBACK.
```

Fig.29

```
 IDENTIFICATION          DIVISION.
 PROGRAM-ID.             EXAM6.

ENVIRONMENT             DIVISION.
 CONFIGURATION           SECTION.
   SOURCE-COMPUTER. FACOM.
   OBJECT-COMPUTER. FACOM.

DATA                    DIVISION.
 WORKING-STORAGE SECTION.
  01 A .
     02 AAA1 PIC 9(1).
     02 AAA2 PIC 9(1).
     02 AAA3 PIC 9(1).

PROCEDURE               DIVISION.
  SEC-MAIN SECTION.

EVALUATE AAA1
        WHEN 1 PERFORM SHORI1
        WHEN 2 PERFORM SHORI2
        WHEN 3 PERFORM SHORI3
     END-EVALUATE.
     EVALUATE AAA2
        WHEN 1 PERFORM SHORI4
        WHEN 2 PERFORM SHORI5
        WHEN 3 PERFORM SHORI6
     END-EVALUATE.
     EVALUATE AAA3
        WHEN 1 PERFORM SHORI7
        WHEN 2 PERFORM SHORI8
        WHEN 3 PERFORM SHORI9
     END-EVALUATE.

SEC-MAIN-E.
     GOBACK.
```

Fig.30

```
IDENTIFICATION         DIVISION.
PROGRAM-ID.            EXAM4.

ENVIRONMENT            DIVISION.
CONFIGURATION          SECTION.
 SOURCE-COMPUTER. FACOM.
 OBJECT-COMPUTER. FACOM.

DATA                   DIVISION.
WORKING-STORAGE SECTION.
 01 A PIC 9(1).
 01 B PIC 9(1).
 01 C PIC 9(1).

PROCEDURE              DIVISION.
 SEC-MAIN SECTION.

EVALUATE A
    WHEN 1
       EVALUATE B
          WHEN 1 PERFORM SHORI1
          WHEN 2 PERFORM SHORI2
          WHEN 3 PERFORM SHORI3
       END-EVALUATE
    WHEN 2
       EVALUATE C
          WHEN 1 PERFORM SHORI4
          WHEN 2 PERFORM SHORI5
          WHEN 3 PERFORM SHORI6
       END-EVALUATE
 END-EVALUATE.

SEC-MAIN-E.
  GOBACK.
```

Fig.31

```
IDENTIFICATION         DIVISION.
PROGRAM-ID.            EXAM5.

ENVIRONMENT            DIVISION.
CONFIGURATION          SECTION.
  SOURCE-COMPUTER. FACOM.
  OBJECT-COMPUTER. FACOM.

DATA                   DIVISION.
WORKING-STORAGE SECTION.
  01 A PIC 9(1).
  01 B PIC 9(1).
  01 C PIC 9(1).

PROCEDURE              DIVISION.
 SEC-MAIN SECTION.

EVALUATE A
      WHEN 1
        EVALUATE B
          WHEN 1 PERFORM SHORI1
          WHEN 2 PERFORM SHORI2
          WHEN 3 PERFORM SHORI3
        END-EVALUATE
      WHEN 2
        EVALUATE B
          WHEN 1 PERFORM SHORI4
          WHEN 2 PERFORM SHORI5
          WHEN 3 PERFORM SHORI6
        END-EVALUATE
      WHEN 3
        EVALUATE B
          WHEN 1 PERFORM SHORI7
          WHEN 2 PERFORM SHORI8
          WHEN 3 PERFORM SHORI9
        END-EVALUATE
    END-EVALUATE.

SEC-MAIN-E.
  GOBACK.
```

Fig.32

(EXAM1)
LIST OF AREA NAME

1 EXECUTE FOLLOWING PROCESS

| CONDITION | | CONTENTS OF PROCESS |
|---|---|---|
| A = 1 | | EXECUTE SHORI-1 |
| A ≠ 1 | B = 2 | EXECUTE SHORI-2 |
| | ELSE | EXECUTE SHORI-3 |

2 (SEC-MAIN-E)
RETURN TO REQUEST SOURCE

Fig.33

(EXAM3)
LIST OF AREA NAME

1 EXECUTE FOLLOWING PROCESS

| A | B | C | CONTENTS OF PROCESS |
|---|---|---|---|
| 1 | 2 | 3 | EXECUTE SHORI-1 |
| 4 | 5 | 6 | EXECUTE SHORI-2 |
| 7 | 8 | 9 | EXECUTE SHORI-3 |

2 (SEC-MAIN-E)
   RETURN TO REQUEST SOURCE

Fig.34

(EXAM2)
LIST OF AREA NAME

1 EXECUTE FOLLOWING PROCESS

| A | CONTENTS OF PROCESS |
|---|---|
| 1 | EXECUTE SHORI-1 |
| 2 | EXECUTE SHORI-2 |
| 3 | EXECUTE SHORI-3 |

2 (SEC-MAIN-E)
  RETURN TO REQUEST SOURCE

Fig.35

(EXAM6)
LIST OF AREA NAME

1 EXECUTE FOLLOWING PROCESS

|      | 1                  | 2                  | 3                  |
|------|--------------------|--------------------|--------------------|
| AAA1 | EXECUTE SHORI-1    | EXECUTE SHORI-2    | EXECUTE SHORI-3    |
| AAA2 | EXECUTE SHORI-4    | EXECUTE SHORI-5    | EXECUTE SHORI-6    |
| AAA3 | EXECUTE SHORI-7    | EXECUTE SHORI-8    | EXECUTE SHORI-9    |

2 (SEC-MAIN-E)
   RETURN TO REQUEST SOURCE

Fig.36

(EXAM4)
LIST OF AREA NAME

1 EXECUTE FOLLOWING PROCESS

| A | | CONTENTS OF PROCESS |
|---|---|---|
| | B | CONTENTS OF PROCESS |
| | 1 | EXECUTE SHORI-1 |
| | 2 | EXECUTE SHORI-2 |
| | 3 | EXECUTE SHORI-3 |
| 2 | C | CONTENTS OF PROCESS |
| | 1 | EXECUTE SHORI-4 |
| | 2 | EXECUTE SHORI-5 |
| | 3 | EXECUTE SHORI-6 |

2 (SEC-MAIN-E)
RETURN TO REQUEST SOURCE

Fig.37

(EXAM5)
LIST OF AREA NAME

1 EXECUTE FOLLOWING PROCESS

| A/B | 1 | 2 | 3 |
|---|---|---|---|
| 1 | EXECUTE SHORI-1 | EXECUTE SHORI-2 | EXECUTE SHORI-3 |
| 2 | EXECUTE SHORI-4 | EXECUTE SHORI-5 | EXECUTE SHORI-6 |
| 3 | EXECUTE SHORI-7 | EXECUTE SHORI-8 | EXECUTE SHORI-9 |

2 (SEC-MAIN-E)
    RETURN TO REQUEST SOURCE

Fig.38

```
: CONDITIONAL BRANCH (if) :
: (RULE 1)
((ifs (?BNS ?ROWS)) <- (*if* ?BNS ?COND1
                        (*then* (stmnts (?S1)))
                        (*else* (ifs (?BNS1 ?ROWS1))))
                       ( add-to-rows2 '?COND1 '?S1 '?ROWS1 '?ROWS))

: (RULE 2)
((ifs (?BNS ?ROWS)) <- (*if* ?BNS ?COND1
                        (*then* (stmnts (?S1)))
                        (*else* (stmnts (?S2))))
                       ( add-to-rows3 '?COND1 '?S1 '?S2 '?ROWS))

: CONDITIONAL BRANCH (evaluate) :
: IN CASE OF EQUAL CONDITION BASED ON NEST OF "EVALUATE"
: (RULE 3)
((multi-evaluate-3 (?BNS ?ROWS)) <- (*evaluate* ?BNS
                                     (*explist* (expr (?EXP1)))
                                     (when-part4 (?BNS1 ?EXP1 ?COND1 ?ROWS1)))
                                    ( title-table4 '?EXP1 '?COND1 '?ROWS1 '?ROWS))

: (RULE 4)
((when-part4 (?BNS ?EXP1 ?COND2 ?ROWS)) <- (*when* ?BNS (*whenor* (cndlst (?COND1)))
                                            (single-evaluate-0 (?BNS1 ?ROWS1))
                                            (when-part4 (?BNS2 ?EXP1 ?COND2 ?ROWS2)))
                                           ( same-condition-3 '?EXP1 '?COND2 '?ROWS1
                                             merge-rows7 '?COND1 '?ROWS1 '?ROWS2 '?ROWS))

: (RULE 5)
((when-part4 (?BNS ?EXP1 ?COND2 ?ROWS)) <- (*when* ?BNS (*whenor* (cndlst (?COND1)))
                                            (single-evaluate-0 (?BNS1 ?ROWS1)))
                                           ( same-condition-3 '?EXP1 '?COND2 '?ROWS1
                                             merge-rows7 '?COND1 '?ROWS1 nil '?ROWS))
```

Fig.40

```
IDENTIFICATION DIVISION.
PROGRAM-ID.     EXAMPLE1.
ENVIRONMENT DIVISION.
...
DATA DIVISION.
...
01 A 9(1).
01 B 9(1).
01 C 9(1).
01 D 9(1).
01 E 9(1).
01 F 9(1).
01 X 9(1).
01 Y ZZZ,ZZZ,ZZ9.
...
PROCEDURE DIVISION.
SEC-MAIN SECTION.
MOVE A TO B.
PERFORM SEC-ERROR.
MOVE C TO D.
CALL "SUB-MODULE".
EVALUATE A
   WHEN 1
      IF B-1 THEN PERFORM SHORI1
             ELSE CONTINUE
      END-IF
   WHEN 2
      IF B-2 THEN GOTO SEC-ERROR.ERR1
             ELSE PERFORM SHORI2
      END-IF
   END-EVALUATE.
MOVE 1 TO C.

SEC-ERROR SECTION.
MOVE E TO F.
ERR1.
IF A=1 THEN PERFORM SHORI1
ELSE IF B=2 THEN PERFORM SHORI2
ELSE PERFORM SHORI3
END-IF.

PERFORM SHORI4.

SHORI1 SECTION.
...
MOVE 1 TO A.

SHORI2 SECTION.
....
EXIT-PROGRAM.

SHORI3 SECTION.
...
GOTO SEC-ERROR.ERR1.

SHORI4 SECTION.
MOVE 50000 TO X.
MOVE X TO Y.
```

Fig.41A

1. SETTING OF PARAMETER
   SET A TO PARAMETER B
2. CALL OF ERROR PROCESS
   6. ERROR PROCESS
3. SETTING OF RETURN CODE
   SET E TO RETURN CODE F
4. CALL OF SUB-MODULE
   4.1 CALL "SUB-MODULE"
   4.2 CONFIRM RESULT OF REQUEST
      4.2.1 WHEN A=1

4.2.1.1 IF B=2 7. EXECUTE CHECK PROCESS
         4.2.1.2 ELSE 5. EXECUTE SETTING OF RETURN CODE 4.2.2 WHEN A=2

4.2.2.1 IF B=1 6.2 EXECUTE ERROR PROCESS
         4.2.2.2 ELSE 8. EXECUTE EDITING PROCESS

5. SETTING OF RETURN CODE
   SET 1 TO RETURN CODE C

6. ERROR PROCESS
  6.1 SETTING OF MESSAGE CODE
    SET E TO MESSAGE CODE F
  6.2 ERROR PROCESS FOR RESULT OF REQUEST
    EXECUTE FOILOWING PROCESS

| CONDITION | | CONTENTS OF PROCESS |
|---|---|---|
| A=1 | | 7. CHECK PROCESS |
| A≠1 | B=2 | 8. EDITING PROCESS RETURN TO REQUEST SOURCE |
| | ELSE | 9. CALL PROCESS 6.2 ERROR PROCESS FOR RESULT OF REQUEST |

6.3 SHAPED OUTPUT

SUBSTITUTE 50000 FOR X

WHEN SUBSTITUTING X FOR Y, PROVIDE "," FOR EVERY THREE CARRIES FROM RIGHT OF DATA.
    EXCEPT FOR FIRST CARRY, OUTPUT "BLANK" FOR CARRY HAVING NO DATA.

7. CHECK PROCESS
  ...
8. EDITING PROCESS
  ...
  RETURN TO REQUEST SOURCE
9. CALL PROCESS
  ...
  6.2 EXECUTE ERROR PROCESS FOR RESULT OF REQUEST

GENERATING A NATURAL LANGUAGE SPECIFICATION OF A COMPUTER PROGRAM BY GENERATING AN INTERMEDIATE EXPRESSION TABLE BASED ON A FLOW CHART FROM ANALYZED SYNTAX OF THE PROGRAM

This application is a continuation of application Ser. No. 08/381,436, filed Jan. 31, 1995, now abandoned.

BACKGROUND OF THE INVENTION

1. Field of the Invention

The present invention relates to a specification generating method for generating a specification, for example, a design specification, from a computer program. More particularly, it relates to a specification generating method which can easily understand a flowchart of a computer program when generating the specification therefrom. Particularly, when a process moves from a main routine to a sub-routine in accordance with a conditional branch or a call operation, the present invention can easily understand the computer program.

2. Description of the Related Art

In general, a lot of time is required to understand the contents of a computer program when developing and maintaining the program. Particularly, when a computer designer develops a new computer program which is similar to an original one, many troublesome procedures are required for sorting the main/sub-routines of the original program in accordance with the contents of the process. As a result, almost all the time is spent on understanding the contents of the program before generating the specification of the computer program.

In a specification of a computer program in a conventional art, many specifications are formed in dependence of a structure (syntax) of the computer program, and they are not formed in accordance with a flowchart or a process chart of the program. Further, there is a known method of using a decision table when expressing a conditional branch in the conventional specification. In the conventional art, however, when any sub-routine is called from a main routine, it is very difficult to determine the destination of the call if no mark is provided for the destination of the call.

SUMMARY OF THE INVENTION

The object of the present invention is to provide a specification generating method which can easily understand a flowchart of a computer program and easily generates the specification therefrom.

In accordance with the present invention, there is provided a specification generating method for a computer program comprising the steps of: analyzing the syntax of a predetermined computer program; generating a control flowchart based on the analyzed syntax; generating an intermediate expression table based on the control flowchart; providing block numbers for calls and branched destinations; attaching an item number and a heading to every call and branched destinations; and generating the specification of the computer program, using a natural language, based on the item number and the heading.

In a preferred embodiment, a specification generating method further comprises the step of: providing a block number for a sentence which indicates a continuation of a process (CONTINUE) in a conditional branched sentence; and attaching the item number and the heading thereto.

In another preferred embodiment, a specification generating method further comprises the step of: checking the destination of sub-routine after execution; determining whether there is a path which returns to a call source; describing a "return to call source after execution" when there is the path; determining whether there is another path which branches to another sub-routine when there is no path in above step; describing a "branch to another sub-routine after execution" when there is another sub-routine; and describing a "complete program after execution" when there is no another sub-routine.

In still another preferred embodiment, a specification generating method further comprises the step of: counting the number of the calls for all sub-routines; counting the number of lines of the specification; comparing the number of the lines with a reference value; further comparing the number of the call with the reference value when the reference value is larger than the number of the lines; and expanding the sub-routine to the call source when the reference number is larger than the number of the call.

In still another preferred embodiment, a specification generating method further comprises the step of: extracting a type definition from every data item; determining whether an editing pattern is different between a setting source and a setting destination; and generating an explanation sentence for a type conversion when the editing pattern is different therebetween.

In still another preferred embodiment, a specification generating method further comprises the step of: generating a table suitable for each conditional branched sentence.

BRIEF DESCRIPTION OF THE DRAWINGS

FIGS. 1A to 1D show explanatory views for explaining a program, a syntax tree, a control flowchart and a data flowchart in an analysis of a computer program;

FIG. 2 is a process flowchart for explaining a specification generating method according to the present invention;

FIG. 3 shows an example of a COBOL program;

FIG. 5 shows an example of an intermediate expression table of the COBOL program shown in FIG. 3;

FIG. 6 shows an example of a specification generated from the COBOL program shown in FIG. 3;

FIG. 7 is a process flowchart for explaining all processes shown in FIGS. 1 to 6;

FIG. 8 is another example of a COBOL program;

FIG. 9 shows an intermediate step of the specification obtained by FIG. 8;

FIG. 11 shows one example of an intermediate expression table of the COBOL program shown in FIG. 8;

FIG. 12 shows a final specification generated from the COBOL program shown in FIG. 8;

FIG. 16 is a still another example of the COBOL program;

FIG. 17 shows a specification generated from the COBOL program shown in FIG. 16;

FIG. 20 is a still another example of the COBOL program;

FIG. 21 shows a specification generated from the COBOL program shown in FIG. 20;

FIG. 22 shows an example of a type conversion of the program;

FIG. 23 is an explanatory view for explaining one example of a type conversion;

FIG. 24 is an explanatory view for explaining another example of a type conversion;

FIG. 26 shows an example of a conditional branch sentence;

FIG. 27 shows another example of the conditional branch sentence;

FIG. 28 shows still another example of the conditional branch sentence;

FIG. 29 shows still another example of the conditional branch sentence;

FIG. 30 shows still another example of the conditional branch sentence;

FIG. 31 shows still another example of the conditional branch sentence;

FIG. 32 shows a table corresponding to the conditional branch sentence shown in FIG. 26;

FIG. 33 shows the table corresponding to the conditional branch sentence shown in FIG. 27;

FIG. 34 shows the table corresponding to the conditional branch sentence shown in FIG. 28;

FIG. 35 shows the table corresponding to the conditional branch sentence shown in FIG. 29;

FIG. 36 shows the table corresponding to the conditional branch sentence shown in FIG. 30;

FIG. 37 shows the table corresponding to the conditional branch sentence shown in FIG. 31;

FIG. 38 shows one example of a conversion rule;

FIG. 40 shows an example of the COBOL program generated from all previous programs according to the present invention; and FIGS. 41A and 41B show a specification generated from the COBOL program shown in FIG. 40 according to the present invention.

DESCRIPTION OF THE PREFERRED EMBODIMENTS

Figure 4:
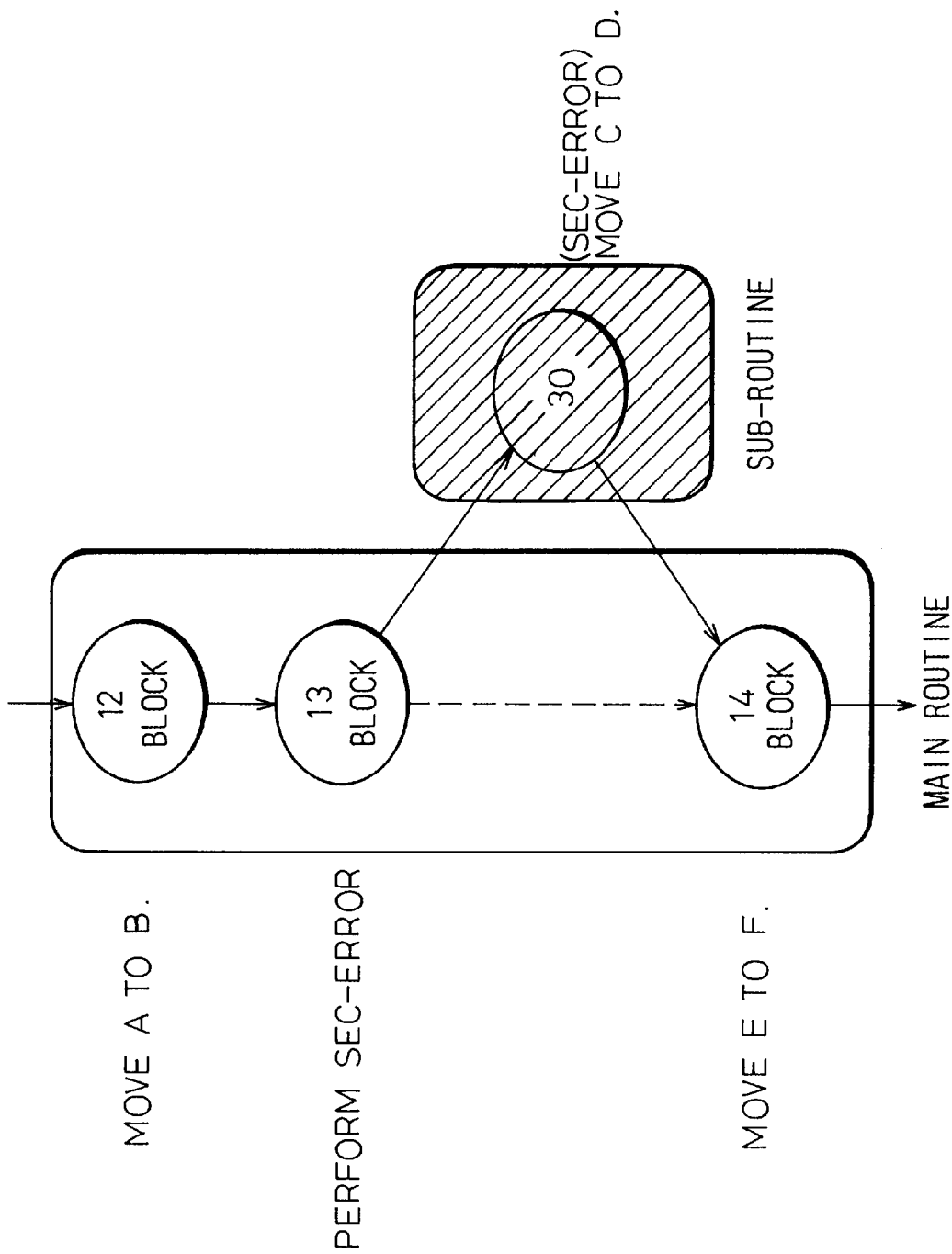
FIG. 4 is a control flowchart generated from the COBOL program shown in FIG. 3.

FIGS. 1A to 1D show explanatory views for explaining a program, a syntax tree, a control flowchart and a data flowchart in an analysis of a computer program. FIG. 1A shows one example of a part of a computer program; FIG. 1B shows a syntax tree corresponding to the program shown by FIG. 1A; FIG. 1C shows a control flowchart corresponding to the syntax tree shown by FIG. 1B; and FIG. 1D shows a data flowchart corresponding to the control flowchart shown by FIG. 1C. The specification generating method according to the present invention utilizes these flowcharts.

In FIG. 1A, this program (for example, a COBOL program) shows one simplified example of a procedure. In FIG. 1B, the syntax tree is provided in accordance with the program. As shown by the drawing, the procedure is formed by an assignment statement (ASSIG-S) and a conditional statement (CONDI-S). Further, the assignment statement is branched to "10" and "A", and the conditional statement is branched to "condition (CONDI)", "THEN" and "ELSE". Still further, the condition is given by "greater than" sign which is branched to "C" and "10". Still further, the conditional statement "THEN" is branched to "A" and "B", and the conditional statement "ELSE" is branched to "20" and "B".

In FIG. 1C, the control flowchart is shown by three blocks. That is, the control block (MOVE 10 TO A IF C>10) is branched to the control block (MOVE A TO B) and the control block (MOVE 20 TO B). In FIG. 1D, the data flowchart is formed by data in the control flowchart and shown by four elements "10", "20", "A" and "B".

FIG. 2 is a process flowchart for explaining a specification generating method according to the present invention. First, a predetermined computer program, for example, a COBOL program, is provided. Next, the syntax of this program is analyzed in order to generate an intermediate expression table (S1). Next, the sub-routine is called from the main routine and expanded therefrom (S2). In the present invention, after the sub-routine is called and expanded from the main routine, when the sub-routine is not returned to the original call, i.e., the main routine, the sub-routine is distinctly expressed. Further, the sub-routine is expanded on the original call in accordance with the number of the call and the size thereof.

Next, the control and data flowcharts (see, FIG. 1) are generated based on the syntax analysis (S3). Further, the program is separated into two processes, i.e., the processes at a normal state and at an abnormal state, in order to recognize an error process (S4). Further, the branch point separating the normal state and the abnormal state is extracted in order to recognize a check process (S5). An intermediate variable (i.e., work variable), which is used in the generating process of the program, is erased (S6). Next, an external module of the sub routine is called (S7).

Next, a tabulating operation is executed in order to convert a conditional branch to a table form (S8). That is, the optimum table pattern for each branch sentence is generated for the conditional branch sentence. Next, a result of edition is reduced for every data defining structure (S9). Further, an item number and a heading are generated for every process (S10).

Next, information (i.e., a mark) on a reference portion is added to the item number and the heading when the process is jumped in accordance with the condition and the branch (S11). That is, the present invention utilizes the specification generating method which generates the item number and the heading in accordance with the contents of the process so that destination of the process is indicated by the item number and the heading. Further, when a sentence which indicates a continuation of the following process occurs in the conditional branch sentence, the following process is indicated by the item number and the heading.

Next, the sentence is converted to a natural language for every instruction and data (S12), and the specification is generated (S13) and is displayed on a display apparatus or printed.

FIG. 3 shows one example of a COBOL program, FIG. 4 is a control flowchart generated from the COBOL program shown in FIG. 3, and FIG. 5 shows one example of an intermediate expression of the COBOL program shown in FIG. 3. Further, FIG. 6 shows one example of a specification generated from the COBOL program shown in FIG. 3, and FIG. 7 is a process flowchart for explaining all processes shown in FIGS. 1 to 6.

These drawings correspond to a method for generating the specification by using the item number and the heading based on the contents of the process, and expressing destination of the process based on the item numbers and the headings.

For example, the COBOL program is formed by the syntax as shown in FIG. 3, and this syntax is analyzed in order to generate the control flowchart as shown in FIG. 4. That is, the control flowchart is formed by the main routine and the sub-routine. The main routine is formed by a block 12 (MOVE A TO B), a block 13 (PERFORM SEC-ERROR), and a block 14 (MOVE E TO F). The sub-routine is branched from the block 13 and formed by a block 30 (MOVE C TO D).

In the intermediate expression table in FIG. 5, "12", "13", "14" and "30" are block numbers corresponding to FIG. 4. Further, "120", "121", "122", "250" and "251" are line numbers corresponding to the original program. Still further, "3.1", "3.2", "3.3", "6." and "6.1" are the item numbers. Still further, the phrases "setting of parameter", "call of error process", "setting of return code" and "setting of message code" are the headings.

In FIG. 6, the item number 3.1 is the heading "setting of parameter" which sets the parameter "A" to "B". The item number 3.2 is "call of error process" which executes the error process (i.e., jump to the item number "6."). The item number 3.3 is the heading "setting of return code" which sets the return code "E" to "F". The item number 6. is the heading "error process" from the item number 3.2. The item number 6.1 is the heading "setting of message code" which sets the message code "C" to "D".

In FIG. 7, first, the control flowchart is generated as shown in FIG. 4 (S21). Next, the item number and the heading are attached to each intermediate expression as shown in FIG. 5 (S22). The block number of the destination to be branched (block 30) is called and determined from the control flowchart (S23). Finally, the item number and the heading are called and determined in the branched destination (S24).

Figure 10:
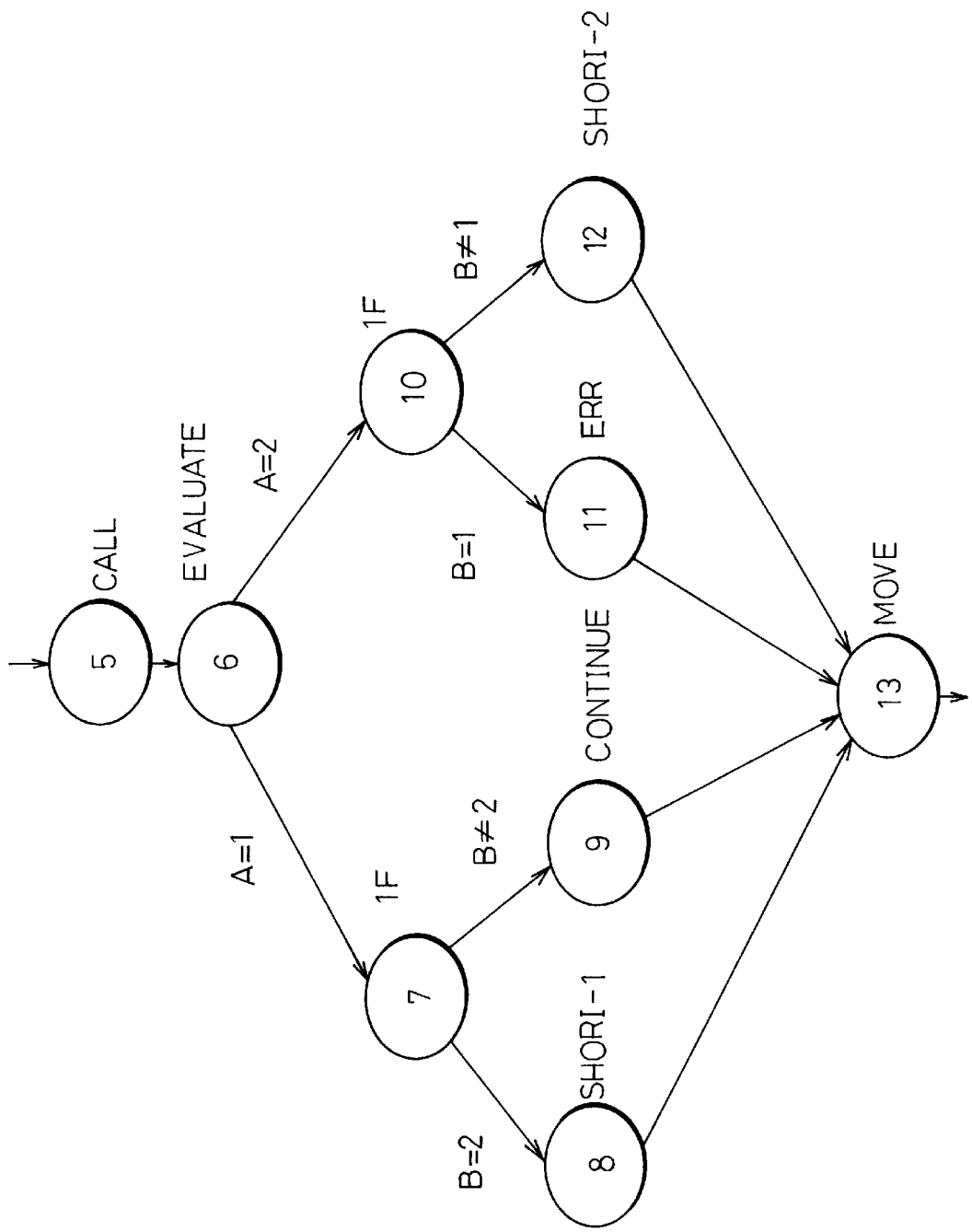
FIG. 10 is a control flowchart generated from the COBOL program shown in FIG. 8.
Figure 13:
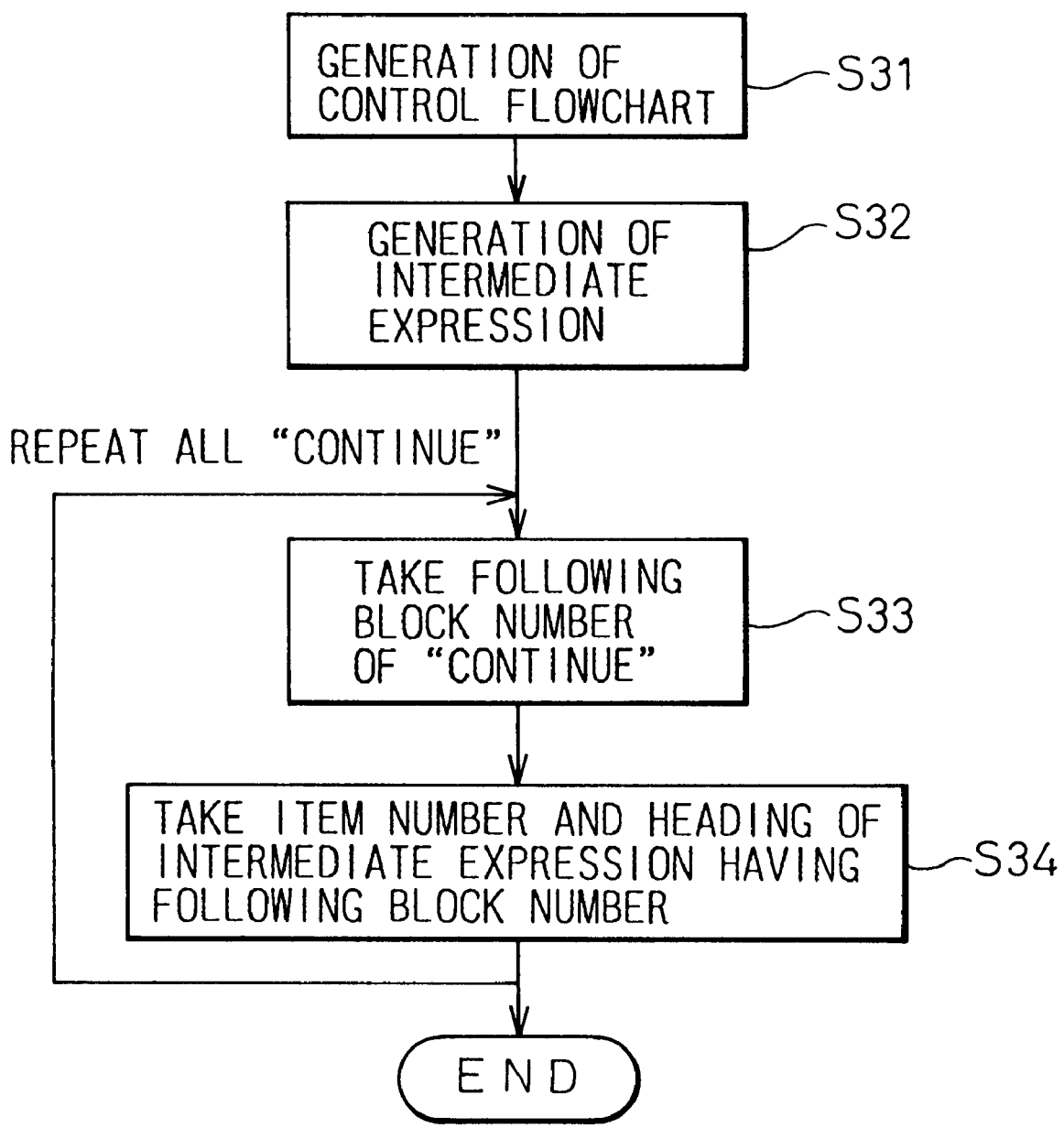
FIG. 13 shows a process flowchart for explaining all processes shown in FIGS. 8 to 12.

FIG. 8 is another example of a COBOL program, FIG. 9 shows an intermediate step of the specification obtained by FIG. 8, FIG. 10 is the control flowchart generated from the COBOL program shown in FIG. 8, FIG. 11 shows one example of the intermediate expression table of the COBOL program shown in FIG. 8, FIG. 12 shows the final specification generated from the COBOL program shown in FIG. 8, and FIG. 13 is a process flowchart for explaining all processes shown in FIGS. 8 to 12.

These drawings correspond to a method for expressing destination of the following process when the statement of the following process occurs in the conditional branch sentence.

In FIG. 8, "SHORI1" and "SHORI2" represent "check process-1" and "check process-2", and "CONTINUE" represents "execute the following process". First, the intermediate specification shown in FIG. 9 is generated from the syntax shown in FIG. 8. In FIG. 9, the item number "3." is the heading "call of sub-module", the item number 3.1 is the heading "call SUB-MODULE", and the item number 3.2 is the heading "confirmation of result".

Further, the item number 3.2.1 is "when A=1", the item number 3.2.1.1. is "when B=2, execute check process (item number 5.)" and the item number 3.2.1.2 is "else, execute the following process". Still further, the item number 3.2.2. is "when A=2", the item number 3.2.2.1 is "when B=1, execute error process (item number 7.)", and the item number 3.2.2.2 is "else, execute an editing process (item number 6.)". Still further, the item number 4. is "setting of return code" which sets the return code "1" to "C".

In the above item number 3.2.1.2, the destination is not clear for the heading "else, execute the following process" which corresponds to "ELSE CONTINUE". Accordingly, the control flowchart shown in FIG. 10 is generated in order to clarify this destination of "following process". In FIG. 10, the block 6 (EVALUATE) is branched to "A=1" and "A=2". Further, the block 7 is branched to "B=2" and "B is not 2", and the block 10 is branched to "B=1" and "B is not 1". Still further, since the block 13 follows after the block 9, the intermediate expression of the block 13, i.e., "setting of return code" can be substituted instead of "following process" (see, FIG. 12).

In the intermediate expression table of FIG. 11, "3.1", "3.2", "3.2.1" and "4" are the item numbers, and "confirmation of result" and "setting of return code" are the headings. In FIG. 12, the item number "3." is the heading "call of sub-module", the item number (1) is "call SUB-MODULE", and the item number (2) is "confirmation of result". Further, in the case of A=1, (a) when B=2, a check process is executed (item number 5), and (b) except for above (or else), setting of the return code is executed (item number 4.).

Still further, in the case of A=2, (a) when B=1, the error process is executed (item number 7.) and (b) except for above, the editing process is executed (item "setting of return code" which sets the return code "1" to "C".

In FIG. 13, first, the control flowchart is generated as shown in FIG. 10 (S31), and next, the intermediate expression is generated as shown in FIG. 9 (S32). Further, the block following "CONTINUE" is generated as shown in FIG. 10 (S33), and finally, the item number and the heading having the same number as the block at the intermediate expression is determined as the destination of the "CONTINUE" (S34). These steps are repeated for all "CONTINUE" statements.

Figure 14A:
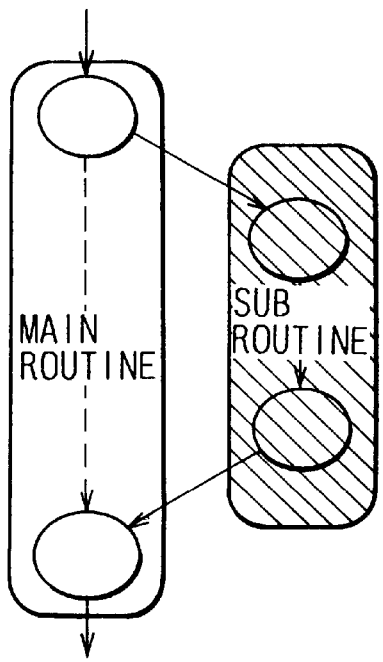
FIGS. 14A to 14C show three patterns of the control flowchart after execution of a sub-routine.
Figure 14B:
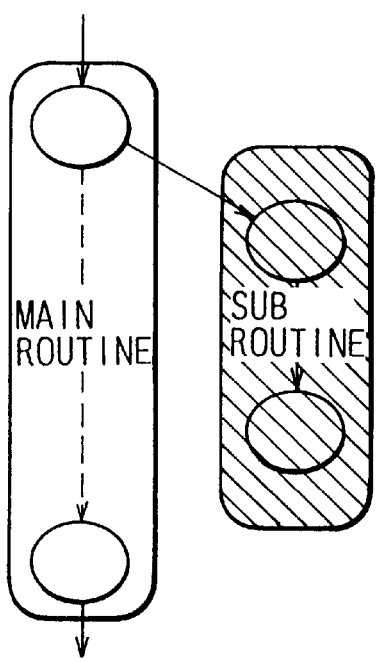
Figure 14C:
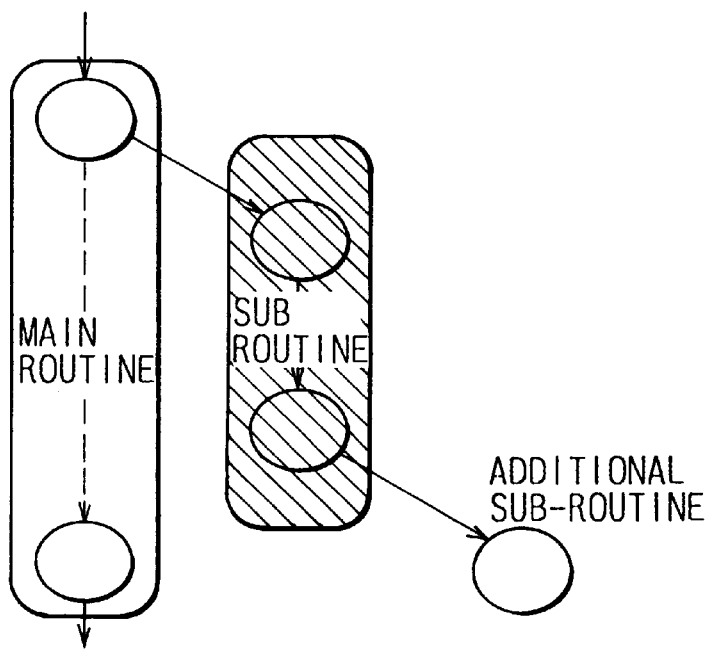
Figure 15:
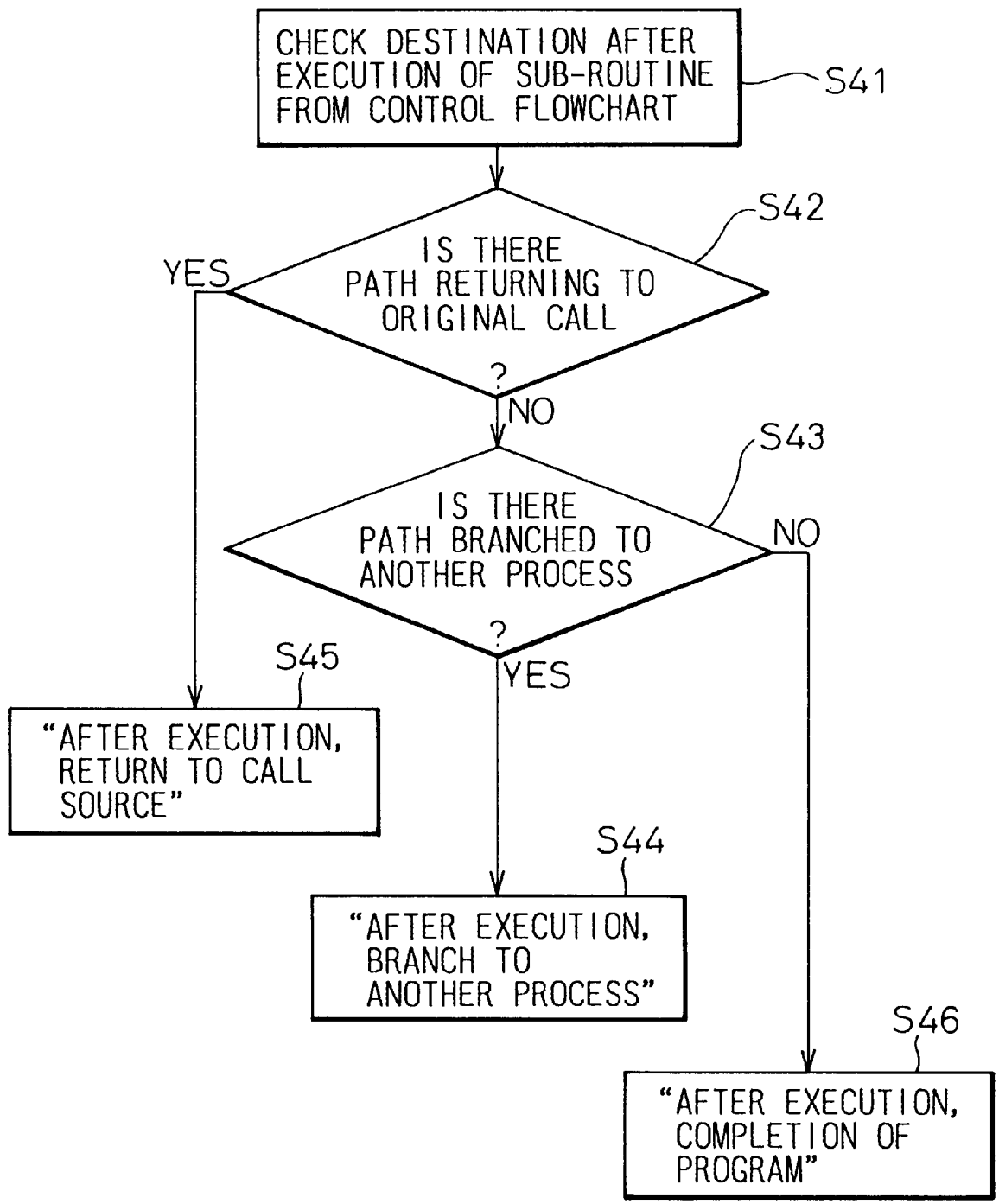
FIG. 15 shows a process flowchart for explaining control flowcharts shown in FIGS. 14A to 14C.

FIGS. 14A to 14C show three patterns of the control flowchart after execution of the sub-routine, and FIG. 15 shows a process flowchart for explaining the control flowcharts shown in FIGS. 14A to 14C. In the case of FIG. 14A, the sub-routine is returned to the original call of the main routine. In the case of FIG. 14B, the sub-routine is finished therein. In the case of FIG. 14C, the sub-routine is further branched to an additional sub-routine.

In FIG. 15, first, destination after execution of the sub-routine is checked by using the control flowchart (S41). Next, the sub-routine is checked as to whether there is a path which returns to the original call (S42). When it is "NO", the sub-routine is checked as to whether there is a path which branches to another process (S43). When the result is "YES", "branched to another process after execution" is described in the specification (S44). When the result is "YES" in step S42, "return to the original call (call source) after execution" is described in the specification (S45).

When the result is "NO" in step S43, "completion of program after execution" is described in the specification (S46).

FIG. 16 is a still another example of the COBOL program, and FIG. 17 shows a specification generated from the COBOL program shown in FIG. 16.

As shown in FIG. 16, "SHORI-1", "SHORI-2" and "SHORI-3" are called by "PERFORM" (Note: "SHORI" is Japanese, and means "process" in English). In this program, after "SHORI-1" is completed, the process goes to the next step, i.e., "execute check process" as shown in FIG. 17. On the other hand, after "SHORI-2" is completed, the process goes to the next step, i.e., "execute editing process and return request source" as shown in FIG. 17.

After "SHORI-3" is completed, the process goes to another process, i.e., "execute call process" based on "GO TO" statement as shown in FIG. 17. In FIG. 16, "MOVE 1 TO A" in SHORI-1, "EXIT-PROGRAM" in SHORI-2 and "GO TO SEC-ERROR" in SHORI-3 correspond to above explanation. In FIG. 17, the item number 6.2 is an error process for the result of the request. The item number 6.3 is a shaped output. The item number 7 is a check process, the item number 8 is an editing process, and the item number 8 is a call process.

These drawings from FIGS. 14 to 17 correspond to a method for expressing a process which does not return to the call source after execution of the sub-routine.

Figure 18:
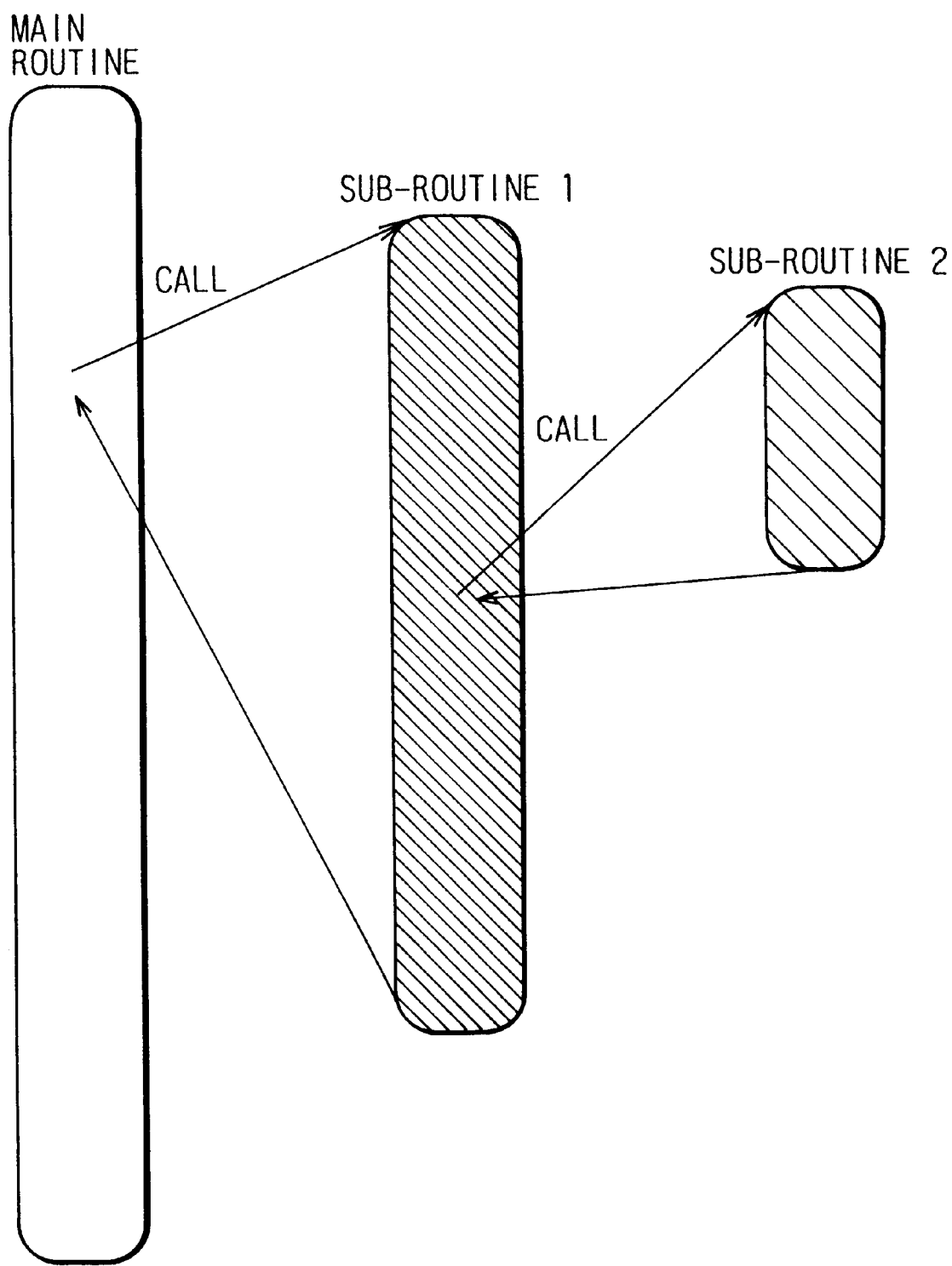
FIG. 18 shows one example of a nest when calling a sub-routine from a main routine.
Figure 19:
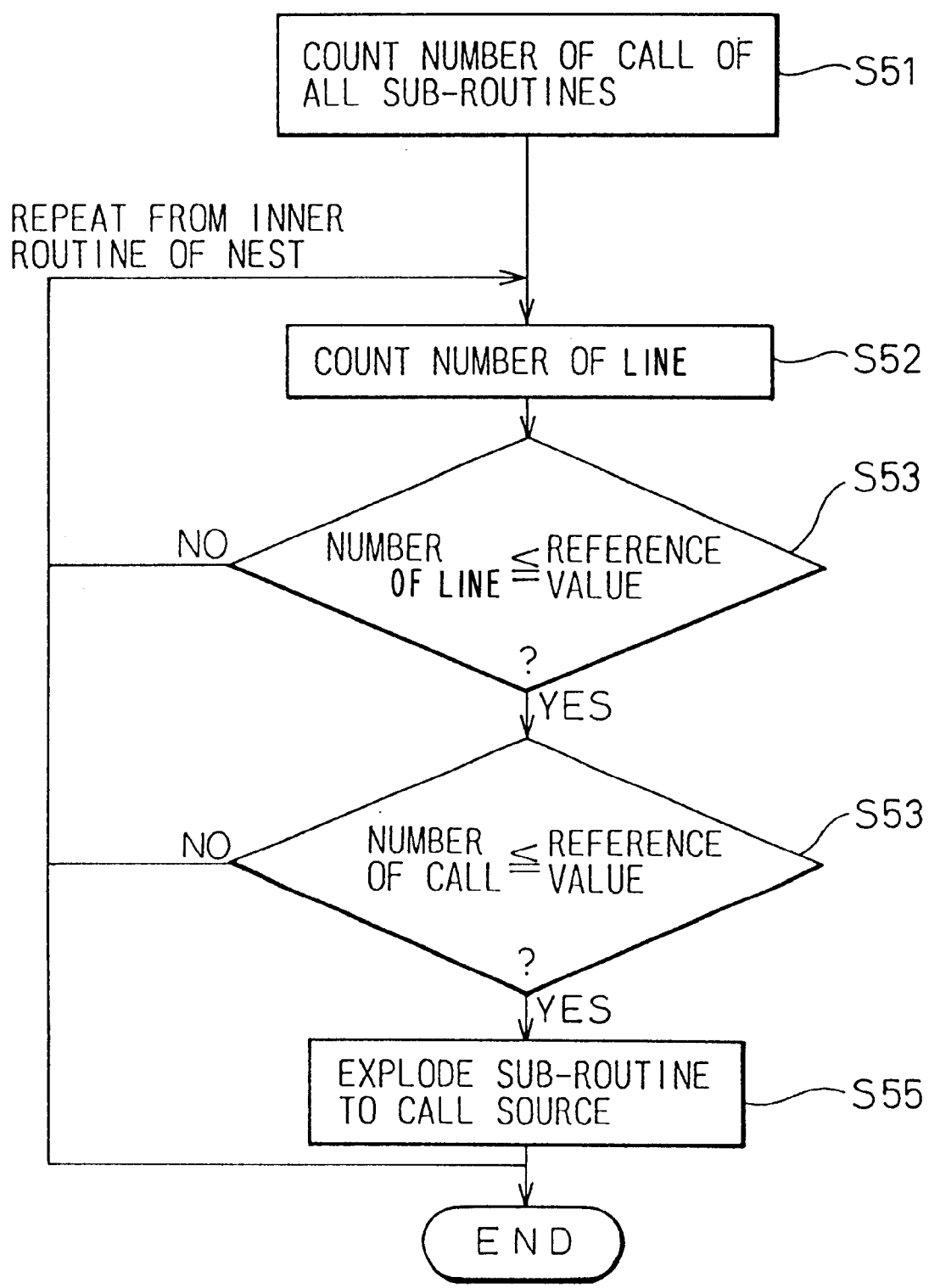
FIG. 19 is a process flowchart for explaining control processes in FIG. 18.

FIG. 18 shows one example of a nest at the call of the sub-routine, and FIG. 19 is a process flowchart for explaining the control processes in FIG. 18.

In FIG. 18, the main routine calls the sub-routine 1, and the sub-routine 1 calls the sub-routine 2.

These steps are explained in FIG. 19. As explained below, when the number of "call" for a predetermined sub-routine and the number of "line" in the specification are smaller than a reference value, the predetermined sub-routine is expanded to the call source. Further, when the call for the sub-routine is set by the nest, the expansion of the sub-routine and the calculation of the line are executed from the inner routine. In the drawing, the expansion is executed from the sub-routine 2. The expansion for the sub-routine 1 is executed by adding the number of "line" of the original sub-routine 1 to the number of "line" of the sub-routine 2.

In FIG. 19, the number of calls for all sub-routines are counted (S51). Next, the number of lines of the specification are counted (S52). In this case, the reference value for the number of calls and the reference value for the number of "lines" are previously determined.

Next, the number of lines is compared to the reference value (S53). When the number of lines is not smaller than the reference number (NO), the process returns to the step S52. When the number of lines is smaller than the reference number (YES), the process goes to the next step. Next, the number of calls is compared to the reference value (S54). When the number of calls is not smaller than the reference number (NO), the process returns to the step S52. When the number of calls is smaller than the reference number (YES), the process goes to the next step. In the next step, the sub-routine is expanded to the call source (S55).

FIG. 20 is a still another example of a COBOL program, and FIG. 21 shows a specification generated from the COBOL program shown in FIG. 20. In this case, it is assumed that the size is less than five instructions and the number of calls is less than twice the calls for the conditions of expansion of the sub-routine. Since "SEC-ERROR SECTION" is less than five instructions and includes the call of the sub-routine (SHORI-4) therein, these instructions are previously expanded. "SHORI-4" is two instructions and expanded in the "SEC-ERROR". Accordingly, since the number of instructions becomes six, "SEC-ERROR" can expand in the call source. Therefore, in the specification generated in FIG. 21, "SEC-ERROR" (6. error process) includes "SHORI-4" (6.3 shaped-output).

In FIG. 21, item number 2 is "call of error process", and the sub-item is "execute error process". Item number 3 is "setting of return code", and sets "E" to the return code "F". Item number 6 is "error process" and is formed from "setting of message code (6.1)", "error process for result of request (6.2)" and "shaped-output (6.3)".

In item number 6.1, "E" is set to the message code "F". In item number 6.2, item number 7 is "execute check process", item number 8 is "execute the editing process and return to the request source", and item number 9 is "execute call process". In item number 6.3, "50000" is substituted for "X". When substituting "X" for "Y", the comma "," is provided for every three carries from the right side of the data. Further, the carry which has no data outputs "blank" except for the first carry.

These drawings of FIGS. 18 to 21 correspond to a method for expanding on the call source in accordance with the reference of the number of calls and the size of the sub-routine.

Figure 25:
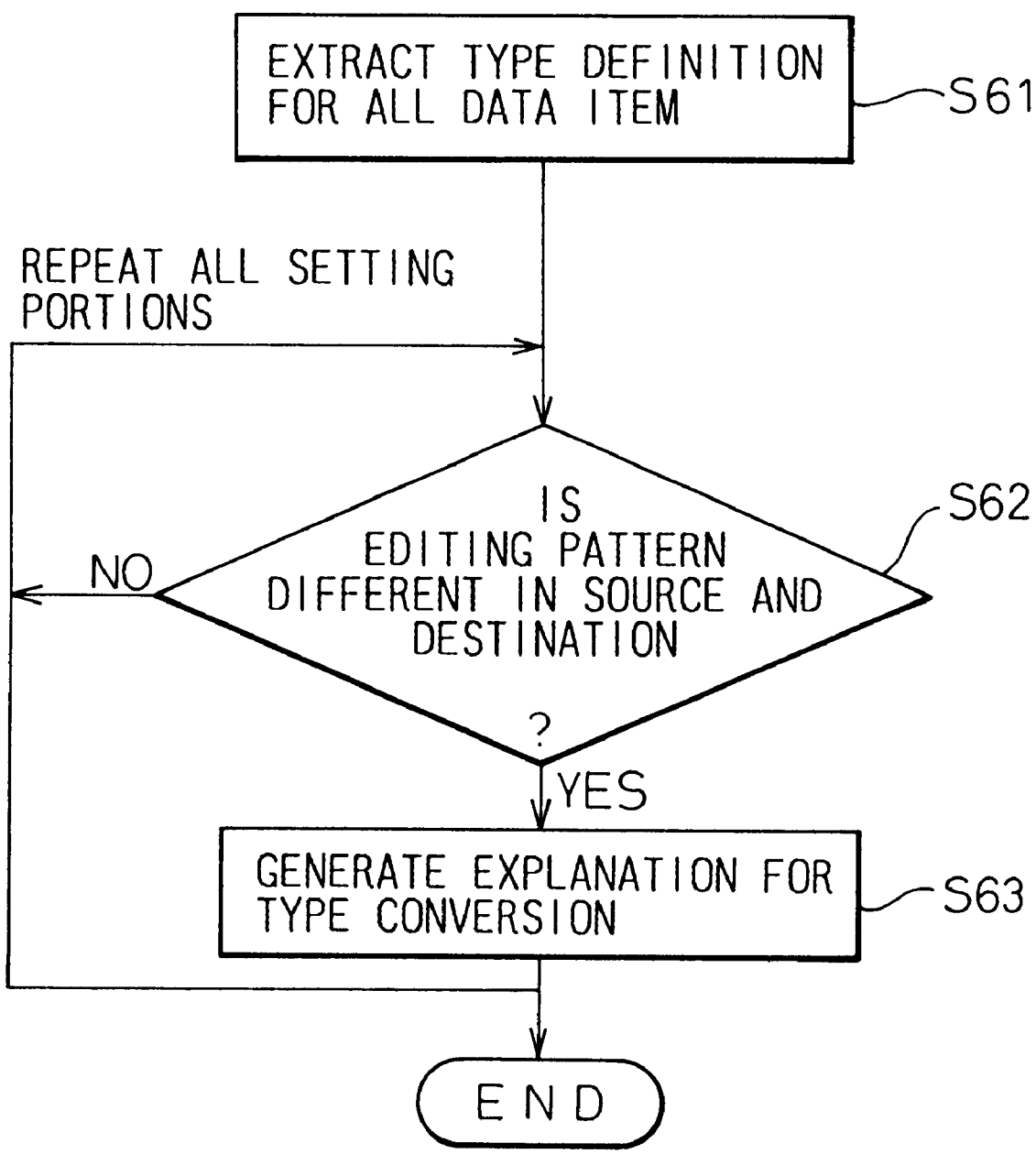
FIG. 25 is a process flowchart for explaining control processes in FIG. 24.

FIG. 22 shows one example of a type conversion, FIG. 23 is an explanatory view for explaining one example of the type conversion, FIG. 24 is an explanatory view for explaining another example of the type conversion, and FIG. 25 is a process flowchart for explaining control processes in FIG. 24.

These drawings correspond to a method for generating explanatory statements based on the type definition in the process which the type conversion is executed in the program.

In FIG. 22, this data conversion is performed for a transfer sentence. In the drawing, "PIC" means a PICTURE, and "9(9)" and "zzz,zzz,zz9" means a PICTURE clause. In a program described by COBOL, a data value may be changed since an editing pattern of the data is different from each other. Accordingly, in order to avoid a change in the data, a data definition section is provided for previously storing the information of a type definition of each data. If the type of the data is different between the destination to be transferred and the source, the statements which explain the type conversion are generated as shown in FIGS. 23 and 24.

In FIG. 23, the explanation is given of the PICTURE clause as follows. That is, "X" is set to "Y" in the form of "zzz,zzz,zz9".

In FIG. 24, the detailed explanation is given as follows. That is, when substituting "X" for "Y", the comma "," is given for every three carries from the right side of the data. Further, "blank" is output for the carry which has no data except for the first carry.

In FIG. 25, the type definition information is extracted from every data item (S61). Next, the judgement is performed as to whether the editing pattern of the setting destination and the setting source is different (S62). When the result is "YES", the explanatory statements are generated for the type conversion (S63). When the result is "NO", the process returns to the step S62, and this step is repeated for all setting portions.

The following explanations are given for a method for generating an optimum table for pattern of each branch sentence.

FIGS. 26 to 31 show various examples of a conditional branch sentence for the COBOL, and FIGS. 32 to 37 show various tables corresponding to each conditional branch sentence shown in FIGS. 26 to 31.

In FIG. 26, as shown in "SEC-MAIN SECTION", "IF" sentence is given by the nest. In order to clarify an exclusive expression of the condition, the table is provided as shown in FIG. 32. That is, the condition of FIG. 32 corresponds to the "IF" sentence of FIG. 26.

In FIG. 27, as shown by "EVALUATE A B C", this example provides a single "EVALUATE" sentence and a plurality of evaluation variables (A, B, C). In this case, the condition is shown in the form of a matrix as shown in FIG. 33.

In FIG. 28, this example is modified from the example of FIG. 27. That is, this example provides a single "EVALUATE" sentences and a single evaluation variable (i.e., "A"). In this case, the condition is shown in the form of the matrix as shown in FIG. 34.

In FIG. 29, this example is further modified from the example of FIG. 28. That is, this example provides a single evaluation variable (i.e., "A") and plural "EVALUATE" sentences are sequentially provided. In the usual case, plural tables like FIG. 34 are provided for this example. However, this example can be simplified as a single table as shown in FIG. 35 because of use of the same condition of the evaluation variable (i.e., conditions are all "A").

In FIG. 30, the "EVALUATE" sentences are given by the nest. That is, the "EVALUATE" sentences B and C are the nest of the "EVALUATE" sentence A. The table is provided as shown in FIG. 36.

In FIG. 31, this example is modified from the example of FIG. 30. That is, in this case, three "EVALUATE" sentences of the nest are provided as the same condition B. The table is provided as shown in FIG. 37.

Figure 39:
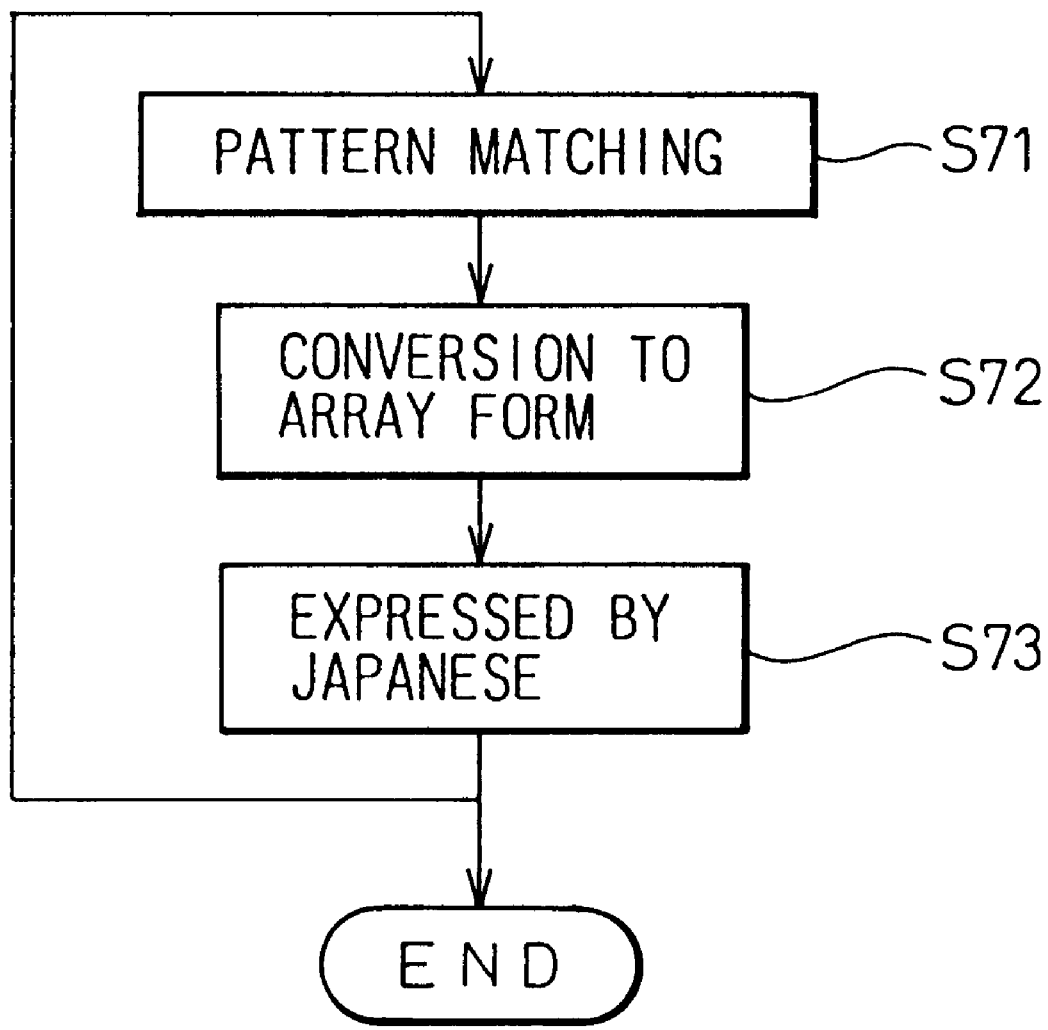
FIG. 39 is a flowchart for explaining processes in FIG. 38.

FIG. 38 shows one example of a conversion rule. Further, FIG. 39 is a flowchart for explaining processes in FIG. 38. In order to provide various tables shown in FIGS. 32 to 37, it is necessary to utilize a pattern matching technique, and various conversion rules and processes thereof. In FIG. 38, only five conversion rules are shown as examples.

In FIG. 39, first, the pattern matching process is executed for each statement (S71), next, after the pattern matching process, the statement is converted to an array type (S72), and finally, the statement is expressed in Japanese (S73).

FIG. 40 shows one example of the COBOL program generated from all previous COBOL programs according to the present invention, and FIG. 41 shows a specification generated from the COBOL program shown in FIG. 40 according to the present invention.

In FIGS. 41A and 41B, item number 1 is set to the heading "setting of parameter", item number 2 is set to the heading "call of error process", item number 3 is set to the heading "setting of return code", item number 4 is set to the heading "call of sub-module", item number 5 is set to the heading "setting of return code", item number 6 is set to the heading "error process", item number 7 is set to the heading "check process", item number 8 is set to the heading "editing process", and item number 9 is set to the heading "call process".

In the "setting of parameter" of item number 1, "A" is set to the parameter "B". In the "call of error process" of item number 2, the error process of item 6 is executed. In the "setting of return code" of the item number 3, "E" is set to the return code "F". In the "call of sub-module" of item number 4, "sub-module" is called (4.1), and the result of the request is confirmed (4.2). Further, when A=1 (4.2.1), if B=2 (4.2.1.1), the check process is executed (7.), and except for B=2 (4.2.1.2), the return code is set (5.). When A=2 (4.2.2), if B=1 (4.2.2.1), the error process is executed (6.), and except for B=1 (4.2.2.2), the editing process is executed (8.).

In the "setting of return code" of the item number 5, "1" is set to the return code "C". In the "error process" of the item number 6, "E" is set to the message code "F" (6.1), and the error process for the result of the request is executed based on the following conditions (6.2). Further, as the shaped-output (6.3), "X" is substituted by 50000. When substituting "X" for "Y", the comma "," is provided for every three carries from the right side of the data. Further, "blank" is output for any carry which has no data except for the first carry. In the "editing process" of the item number 8, the step is returned to the request source. In the "call process" of the item number 9, the step is returned to the error process for the result of the request.

As explained above, according to the specification generating method of the present invention, since it is very easy to understand the flowchart of the computer program and it is possible to clarify the type conversion of the data, it is possible to more easily generate a specification of the computer program compared to a conventional method.

What is claimed is:

1. A method for generating a natural language specification for a computer program comprising the steps of:

analyzing a syntax of a computer program;

generating a control flowchart based on the analyzed syntax, said control flowchart comprising a series of control blocks, and each control block respectively provided with a block number;

generating an intermediate expression table including a natural language expression based on the control flowchart;

identifying calls and branched destinations described in the intermediate expression table;

obtaining block numbers for calls and the branched destinations described in the intermediate expressions;

obtaining an item number and a heading for every call and branched destination based on the obtained block number;

replacing the calls and the branched destination described in the intermediate expression table with the obtained item number and headings; and generating the specification of the computer program, using a natural language.

2. A method as claimed in claim 1, further comprising the steps of:

providing the block number to a sentence which indicates continuation of process (CONTINUE) in a conditional branched sentence; and attaching the item number and the heading thereto.

3. A method as claimed in claim 1, further comprising the steps of:

checking the destination of a sub-routine after execution;

determining whether there is a first path which returns to a call source;

describing "return to call source after execution" when there is a first path;

determining whether there is a second path which is branched to another sub-routine when there is no first path;

describing "branch to another sub-routine after execution" when there is a second path; and describing "complete program after execution" when there is no second path.

4. A method as claimed in claim 1, further comprising the steps of:

counting the number of calls for all sub-routines;

counting the number of lines of the specification;

comparing the number of lines of the specification with a reference value;

further comparing the number of the calls with the reference value when the reference value is larger than the number of the lines of the specification; and expanding the sub-routine to the call source when the reference number is larger than the number of the call.

5. A method as claimed in claim 1, further comprising the steps of:

extracting a type definition from all data items;

determining whether an editing pattern is different between a setting source and a setting destination; and generating an explanation sentence for a type conversion when the editing pattern is different therebetween.

6. A method as claimed in claim 1, further comprising the step of:

generating a table suitable for each conditional branched sentence.

7. A computer system for generating a natural language specification of a computer program comprising:

means for analyzing a syntax of a computer program;

means for generating a control flowchart based on the analyzed syntax said control flowchart comprising a series of control blocks, and each control block respectively provided with a block number means for generating an intermediate expression table including a natural language expression based on the control flowchart;

means for identifying calls and branched destinations described in the intermediate expression table;

means for obtaining block numbers for the calls and the branched destinations identified in the intermediate expressions;

means for obtaining an item number and a heading for every call and branched destination based on the obtained block number;

replacing the calls and the branched destination described in the intermediate expression table with the obtained item number and headings; and means for generating the specification of the computer program, using a natural language.

8. A computer system as claimed in claim 7, further comprising:

means for providing the block number to a sentence which indicates continuation of process (CONTINUE) in a conditional branched sentence; and means for attaching the item number and the heading thereto.

9. A computer system as claimed in claim 7, further comprising:

means for checking the destination of a sub-routine after execution;

means for determining whether there is a first path which returns to a call source;

means for describing "return to call source after execution" when there is a first path;

means for determining whether there is a second path which is branched to another sub-routine when there is no first path;

means for describing "branch to another sub-routine after execution" when there is a second path; and means for describing "complete program after execution" when there is no second path.

10. A computer system as claimed in claim 7, further comprising:

means for counting the number of calls for all sub-routines;

means for counting the number of lines of the specification;

means for comparing the number of lines of the specification with a reference value;

means for further comparing the number of the calls with the reference value when the reference value is larger than the number of the lines of the specification; and means for expanding the sub-routine to the call source when the reference number is larger than the number of the call.

11. A computer system as claimed in claim 7, further comprising:

means for extracting a type definition from all data items;

means for determining whether an editing pattern is different between a setting source and a setting destination; and means for generating an explanation sentence for a type conversion when the editing pattern is different therebetween.

12. A computer system as claimed in claim 7, further comprising:

means generating a table suitable for each conditional branched sentence.

* * * * *